United States Patent
Paritsky et al.

(10) Patent No.: US 6,239,865 B1
(45) Date of Patent: May 29, 2001

(54) SENSOR AND A METHOD FOR MEASURING DISTANCES TO, AND/OR PHYSICAL PROPERTIES OF, A MEDIUM

(75) Inventors: Alexander Paritsky, Jerusalem; Alexander Kots, Ashdod, both of (IL)

(73) Assignee: Phone-Or LTD (IL)

( * ) Notice: Subject to any disclaimer, the term of this patent is extended or adjusted under 35 U.S.C. 154(b) by 0 days.

(21) Appl. No.: 09/382,089

(22) Filed: Aug. 24, 1999

(30) Foreign Application Priority Data

Sep. 10, 1998 (IL) .................................................. 126172

(51) Int. Cl.⁷ .............................. G01C 3/08; G01B 9/10; G01J 1/04; G02B 6/00
(52) U.S. Cl. .................... 356/4.07; 250/227.14; 250/227.28; 385/12
(58) Field of Search ............... 356/4.07; 250/227.28, 250/227.14; 385/12

(56) References Cited

U.S. PATENT DOCUMENTS 4,707,134 * 11/1987 McLachan et al. .
4,978,863 * 12/1990 Lyons et al. .
5,191,206 * 3/1993 Boiarski et al. ................ 250/227.14
5,771,091 6/1998 Paritsky et al. .

* cited by examiner

*Primary Examiner*—Stephen C. Buczinski
(74) *Attorney, Agent, or Firm*—Townsend and Townsend and Crew LLP

(57) ABSTRACT

The invention provides a sensor for measuring the distances to a medium and/or the physical properties thereof, including a housing; at least one pair of optical fibers, each having an input end portion and an output end portion, the input end portion of a first fiber being connectable to a source of light and the output end portion of a second fiber being connectable to light intensity measuring means; a sensor head, including the input end portion of the second optical fiber and the output end portion of the first optical fiber affixedly located at least in proximity to each other; each of the output end portion of the first fiber and input end portion of the second fiber having an axis and a rim, the rims being cut at an angle $\theta$ with respect to the axis and the axes forming an angle $\alpha$ therebetween, and wherein, upon operation, the light emerging from the output end portion of the first fiber impinges on a surface of a medium at an angle of incidence $\beta$, and wherein $\beta = f(\alpha, \theta)$, the output end portion of the first fiber and the input end portion of the second fiber being slightly cut off in a plane traversing at least one of the axes to form edge surfaces interfacing each other.

3 Claims, 1 Drawing Sheet

Fig.1.
Fig.2.
Fig.3.
Fig.4.
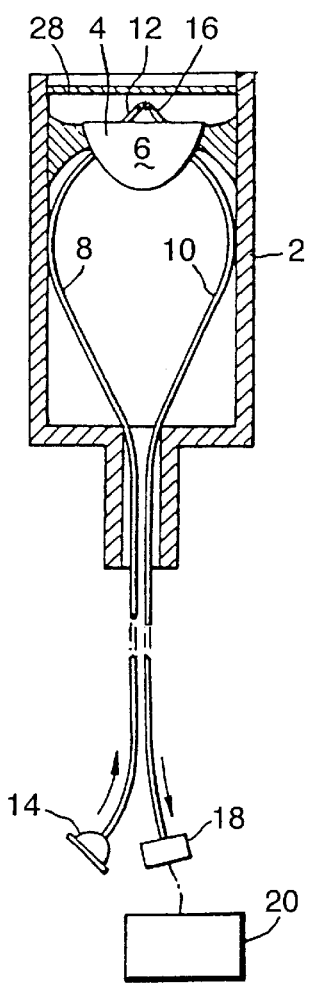
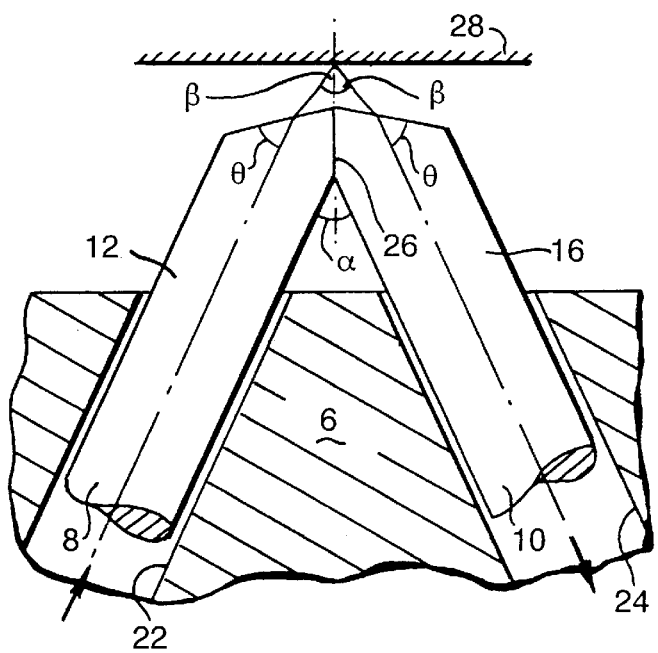
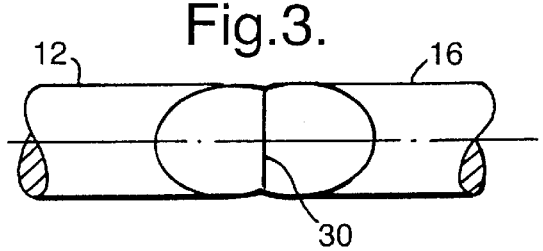
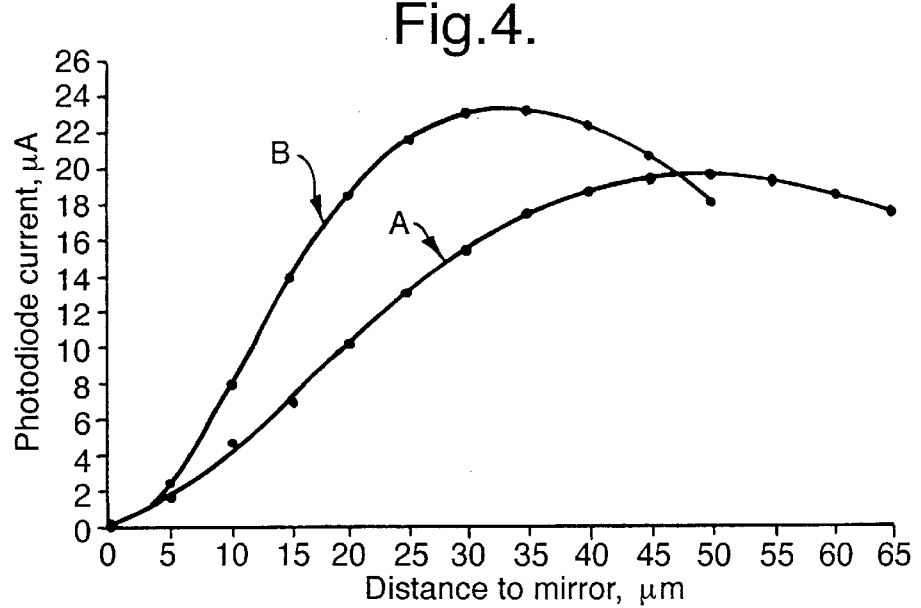

SENSOR AND A METHOD FOR MEASURING DISTANCES TO, AND/OR PHYSICAL PROPERTIES OF, A MEDIUM

TECHNICAL FIELD

The present invention relates to sensors for measuring distances, distances to, and/or physical properties of, a medium. More particularly, the present invention relates to fiber optic sensors for measuring distances to a medium and/or its physical properties.

BACKGROUND ART

In U.S. Pat. No. 5,771,091, entitled "A Sensor and a Method for Measuring Distances to, and/or Physical Properties of, a Medium," there are disclosed various embodiments of such sensors in which the ring at the output end portion of the fiber connectable to a light source and the input end portion connectable to a light intensity measuring means are distant from each other, or at most, slightly touch each other. These sensors, however, suffer from some limitation of their sensitivity connected to the geometry of the disposition of the optical fibers as mounted in the optical heads, which affects the light intensity distribution in the optical fibers.

It is therefore an object of the present invention to overcome these limitations by changing the geometry of the optical fiber end portions.

DISCLOSURE OF THE INVENTION

In accordance with the present invention, there is provided a sensor for sensing the distances to a medium and/or the physical properties thereof, comprising a housing, at least one pair of optical fibers, each having an input end portion and an output end portion, the input end portion of a first fiber being connectable to a source of light and the output end portion of a second fiber being connectable to light intensity measuring means; a sensor head, including said input end portion of said second optical fiber and said output end portion of said first optical fiber affixedly located at least in proximity to each other, each of the output end portion of said first fiber and input end portion of said second fiber having an axis and a rim, said rims being cut at an angle θ with respect to said axis and said axes forming an angle α therebetween, and wherein, upon operation, the light emerging from the output end portion of said first fiber impinges on a surface of a medium at an angle of incidence β, and wherein β=ƒ(α,θ), characterized in that the output end portion of said first fiber and the input end portion of said second fiber are slightly cut off in a plane traversing at least one of said axes to form edge surfaces interfacing each other.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic, partly cross-sectional, overall view of a sensor structured in accordance with the present invention;

FIG. 2 is a side view of a first embodiment of a sensor head utilizable in the sensor of FIG. 1;

FIG. 3 is a top view of the fiber end portions of the sensor head of FIG. 2; and FIG. 4 illustrates characteristic curves showing variations in light intensity for known sensors and the construction of the sensor head according to the present invention.

DETAILED DESCRIPTION OF PREFERRED EMBODIMENTS

Referring now to the drawings, there is shown in FIG. 1 a sensor according to the present invention, comprising a housing 2 accommodating a sensor head 4 including a base 6 serving to mount a pair of optical fibers 8 and 10. The fiber 8 has an output end portion 12 and is connectable at its other end to a light source 14, while the fiber 10 has an input end portion 16 and is connectable at its other end to a light intensity sensing means 18 which, in turn, is connectable to a measuring/calculating unit 20. The base 6 of the sensor head may be constructed of any rigid or semi-rigid material affixable inside, or made integral with, the housing 2.

As shown in greater detail in FIGS. 2 and 3, in the base 6 there are formed two suitable throughgoing holes 22, 24, each sized to hold, by pressure fit or otherwise, a single optical fiber. The direction of the axes of the holes 22, 24 is such that the end portions 12, 16 touch each other along interfacing edges or surfaces 26 formed by cuts made in the fiber walls. The interfacing between the end portions 12, 16 should form an angle α between the traversing axes of the fibers. In addition, the rims of the fibers of the output end portion 12 and the input end portion 16 are cut at an angle θ with respect to the axis of the end portions. The arrangement is such that, upon operation, the light emerging from the output end portion 12 of the first fiber 8 impinges on a surface of a medium 28 at an angle of incidence β wherein β=ƒ(α,θ).

In order to prevent light leakage from the surface 26 of the cut output edge of the first optical fiber to the cut input surface of the second optical fiber, one or both cut interfacing surfaces 26 are advantageously covered by an opaque or reflective material. Instead of such coatings, the prevention of the passage of light from one optical fiber to another may be achieved by placing a thin separator or plate 30, made of an opaque or reflective material, between the interfacing cut edges of the fibers.

In an optical fiber, the light energy is transmitted through the (hollow) core of the fiber. The optical fiber core, however, is surrounded by a cladding having a thickness of about 20 microns. That means that the light energies of both optical fibers, even if they are touching each other, are separated by a distance of about 40 microns. Because of the Gaussian characteristic of the energy distribution in the cross-section of an optical fiber, there is an additional spacing in the range of about 40–50 microns between the main energy-carrying portions of both optical fibers.

FIG. 4 depicts two characteristic curves A and B, showing the variation of light intensity of a known sensor construction (A) and of the construction (B) of a sensor according to the present invention. Curve B is much steeper than curve A. This is the result of the unique cut and interfacing of both ends of the optical fibers, since the closer the light energy carrying portions of both optical fibers are to each other, the larger the sensitivity of the sensor (steepness of the curve) will be. The removal of the 40–50 microns from the end portions of both optical fibers effects a real contact between the major energy-carrying portions of the fibers in the optical head of the sensor. This is the reason why the steepness of the curve B, corresponding to the present invention, is much higher than the steepness of the curve A, corresponding to the known sensor construction.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A sensor for measuring the distances to a medium and/or the physical properties thereof, comprising:

a housing;

at least one pair of optical fibers, each having an input end portion and an output end portion, the input end portion of a first fiber being connectable to a source of light and the output end portion of a second fiber being connectable to light intensity measuring means;

a sensor head, including said input end portion of said second optical fiber and said output end portion of said first optical fiber affixedly located at least in proximity to each other;

each of the output end portion of said first fiber and input end portion of said second fiber having an axis and a rim, said rims being cut at an angle $\theta$ with respect to said axis and said axes forming an angle $\alpha$ therebetween, and wherein, upon operation, the light emerging from the output end portion of said first fiber impinges on a surface of a medium at an angle of incidence $\beta$, and wherein $\beta = f(\alpha, \theta)$, characterized in that the output end portion of said first fiber and the input end portion of said second fiber are slightly cut off in a plane traversing at least one of said axes to form edge surfaces interfacing each other.

2. The sensor as claimed in claim 1, wherein said interfacing surfaces are covered by opaque or reflective material to prevent light leakage from the output end portion of said first fiber directly to the input end portion of said second fiber.

3. The sensor as claimed in claim 1, wherein said interfacing surfaces are divided by a member of opaque or reflective material to prevent light leakage from the output end portion of said first fiber directly to the input end portion of said second fiber.

* * * * *